Sept. 18, 1951     M. E. GLUHAREFF     2,568,230
ROTOR BLADE RETENTION OF A BOLTED
AND CEMENTED CONSTRUCTION
Filed Sept. 10, 1948     2 Sheets-Sheet 1
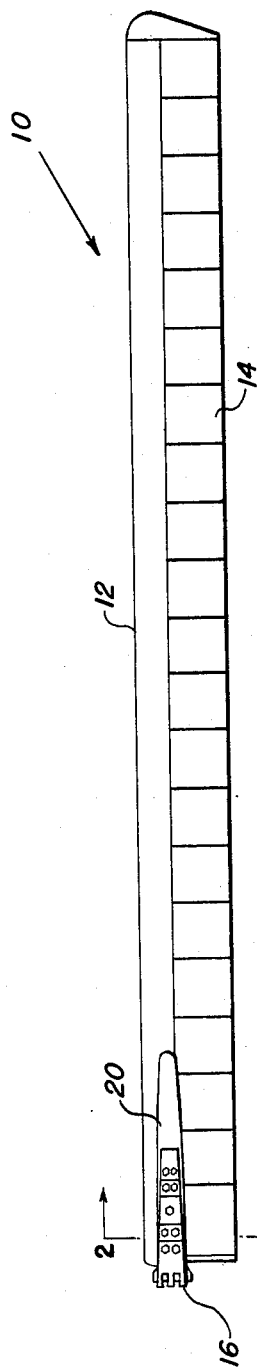
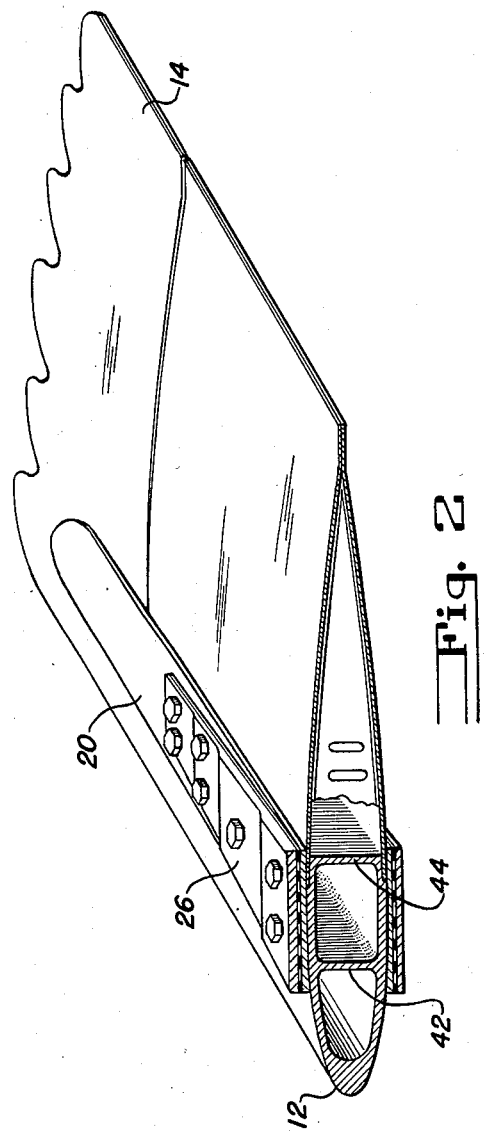
M. E. GLUHAREFF
INVENTOR
BY *M. B. Tasher*
ATTORNEY Patented Sept. 18, 1951

2,568,230

UNITED STATES PATENT OFFICE 2,568,230

ROTOR BLADE RETENTION OF A BOLTED AND CEMENTED CONSTRUCTION

Michael E. Gluhareff, Bridgeport, Conn., assignor to United Aircraft Corporation, East Hartford, Conn., a corporation of Delaware Application September 10, 1948, Serial No. 48,743

9 Claims. (Cl. 170—159)

This invention relates to helicopters and more particularly to an improved rotor blade retention structure.

As a result of the centrifugal loads and vibratory stresses usually imposed upon helicopter rotor blades of metal construction it has often been necessary to thicken the spar of such blades at the root end thereof by forging, upsetting and the like and to build up the metal in cross section in this area to a substantial thickness in order to prevent fatigue and subsequent failure. As a result the finished blade was prohibitively costly and the weight-strength ratio unjustified.

It is therefore an object of this invention to provide a root section construction for helicopter rotor blades and the like which is easily and simply constructed while still possessing adequate strength for the life of the blade.

A further object of this invention is to provide a rotor blade having a uniform load carrying member or spar and a blade retention construction which includes an adhesively attached reinforcing plate to eliminate stress concentrations.

A still further object of this invention is to provide a rotor blade wherein in addition to the above construction a retention fitting is securely fastened both to the blade and to reinforcing plates in such a manner so as to reduce manufacturing costs and still provide a stronger construction within a justifiable weight-strength ratio.

Another object of this invention resides in a simple construction for gradually increasing the effective thickness toward the root end of a rotor blade where a spar of uniform section is utilized and where stress concentrations are avoided at the threshold of the root by the elimination of bolts and the like in that area.

These and other objects will become readily apparent from the following detailed description of the drawings wherein like reference numerals refer to like parts throughout.

In these drawings,

Fig. 1 is a plan view of a helicopter rotor blade having a blade retention structure attached thereto according to this invention.

Fig. 2 is a partial sectional perspective view indicating the general blade construction.

Figure 3:
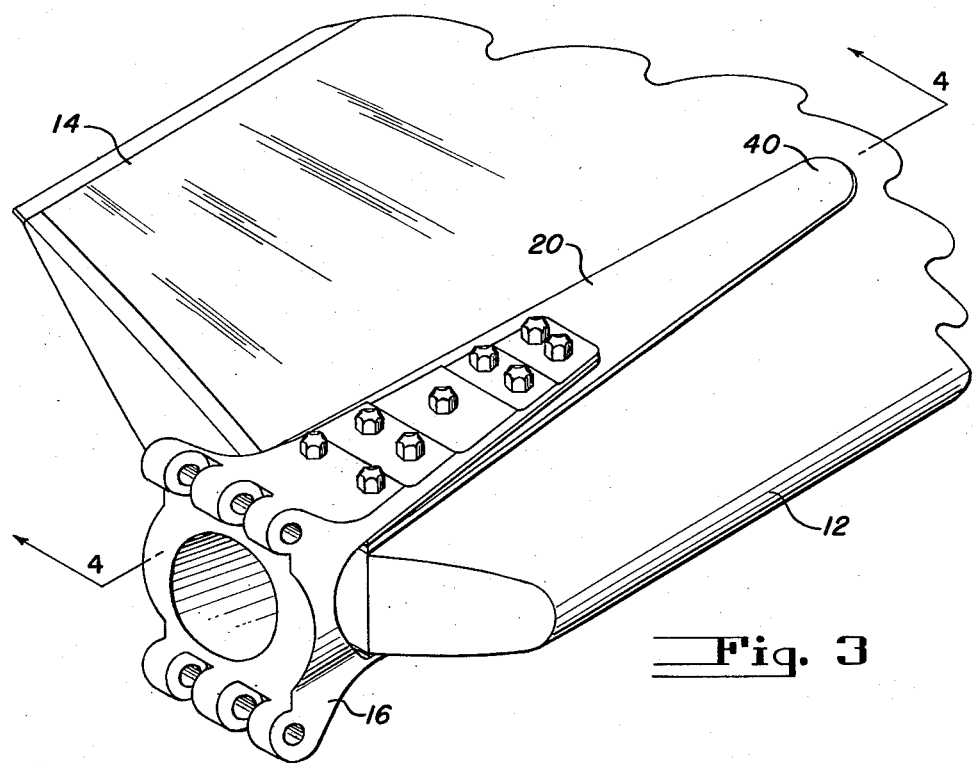
Fig. 3 is a partial perspective view showing the blade retention fitting and reinforcing plates at the root end of the blade.

Referring now to Fig. 1, the numeral 10 generally indicates a metal helicopter rotor blade having a leading edge portion 12 and a trailing edge portion 14. The root end of the blade 10 has a cuff or retention fitting 16 attached thereto in a manner to be described hereinafter.

As seen better in Fig. 2, the leading edge 12 consists of an aluminum extrusion which has the trailing portion 14 attached thereto by a suitable adhesive or by rivets (not shown) which are usually flush with the upper and lower surfaces of the blade. The particular blade construction shown in this figure is fully described and claimed in copending patent application, Serial No. 632,620, filed December 4, 1945, and does not form a specific part of this invention.

Accordingly, this invention comprises a novel method for attaching the blade retention fitting to the blade wherein the thickness of the load carrying spar member or leading edge 12 can be effectively and gradually increased so that the centrifugal and vibratory stresses which are normally induced in the blade during flight can be adequately absorbed without structural failure. To this end (Figs. 3 and 4) a pair of machined reinforcing plates 20 are attached spanwise to the extruded spar member 12 by means of a thermo-setting adhesive under proper temperature and pressure. The reinforcing plates are preferably of a material having a modulus of elasticity equivalent to that of the spar 20 and should preferably absorb at least one-third of the loads at the root. Phenolic anti-friction spacers 24, which are shorter in length than the plates 20, are then placed over the exposed outer surfaces of the reinforcing plates 20 to prevent chafing when the retention fitting 16 is subsequently attached.

A phenolic filler block 30 is then inserted between the inner, upper and lower surfaces of the extrusion 12 in a position approximately at the mid-point of the spanwise length of the reinforcing plates 20. Finally the U-shaped blade retention fitting 16 has its substantially parallel elements 26 attached to the reinforced root end of the blades by the through bolts 32 which are tightened to a torque of approximately 225 inch pounds, the phenolic filler block serving to prevent crushing of the extrusion when such tightening is accomplished. The holes passing through the spar 12 and reinforcing plates 20 to accommodate the through bolts 32, may be drilled slightly oversize, in order that the centrifugal loading may be distributed more evenly between these bolts and the bolts grouped further inboard.

Thin phenolic washers 36 are also utilized on the inner side of the upper and lower surfaces of the extrusion 12 to permit the proper tightening of the attaching bolts 38. It will be noted that the bolts 38 pass only through either the upper or lower surfaces of the extrusion 12 since these are accessible through the open end 39 of the fitting 16 and the extrusion 12.

Figure 4:
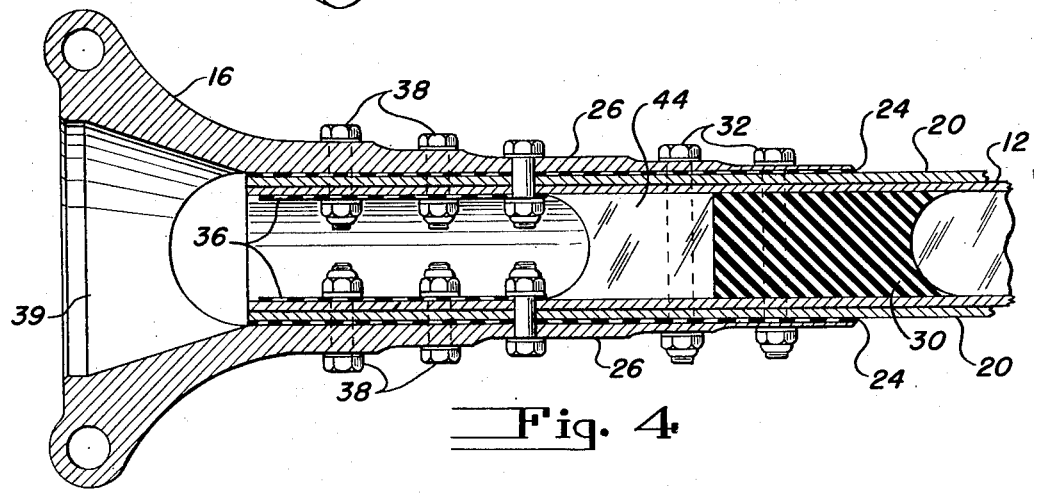
Fig. 4 is a cross sectional view of Fig. 3 taken on the line 4—4.

As shown in somewhat modified form in Fig. 4 the webs 42 and 44 of the spar 12 may be cut back at the root end in order to accommodate the bolts 38 in the event their spacing or size necessitates such an arrangement.

With this type of construction the numerous problems and high costs involved in actually tapering or upsetting metal spars to obtain a thicker root section are eliminated. Further, stress concentrations in the outboard end 40 of the reinforcing plates 20 are avoided since the use of bolts in this area is unnecessary and the use of machined reinforcing plates insures a smooth finish wherein internal stresses are not present as is usually the case in metal parts that are cast, forged, upset or swaged. Thus in the first step in the effectively thickened load carrying area, the centrifugal and vibratory stresses will begin to be divided between the spar 12 and the reinforcing plates 20 so that the plates will absorb at least one-third of the stresses at that point. Farther inboard as the blade root section is additionally effectively thickened by the parallel elements 26 of the retention fitting 16, further stress distribution results thereby permitting use of the through bolts 38 since in this thickened region stress concentrations are no longer critical.

Thus, as a result of this invention it is evident that a retention construction has been provided for a helicopter rotor blade and the like wherein a uniform load carrying spar member can be utilized and a blade retention fitting can be attached thereto at the root end of the blade by a simple method which is adaptable to less costly production. Further, the usual problems of non-uniformity and stress concentrations which are involved in upsetting or swaging are completely eliminated due to the fact that an extruded spar member can be utilized and the spar effectively increased in thickness toward the root end of the blade without the use of bolts or similar attaching means in the most critical areas, i. e., the threshold of the increased blade root section.

Further, as a result of this construction, critical stress concentrations have been eliminated to such an extent that lighter parts can be used which are capable of enduring the anticipated loads imposed on the blade spar throughout the life of the blade. In addition, the life of the blade is increased to the life of the aircraft.

Although only one embodiment of this invention has been described and shown herein, it is obvious that various changes and modifications of the arrangement and shape of the parts can be made without materially departing from the scope of this novel concept.

What it is desired to secure by Letters Patent is:

1. In a helicopter rotor blade assembly, a metal spanwise load carrying member having a constant thickness throughout its length, a blade retention fitting having portions thereof overlying the root end of said member, means for mounting said fitting to said root including metal plates having a modulus of elasticity equivalent to that of said blade and adapted to be adhesively attached to said blade beneath the overlying portions of said fitting, said plates extending outwardly spanwise of said blade beyond said overlying portions of said fitting and adapted to absorb at least one-third of the loads imposed on said member outboard of the overlying portions of said fitting, resilient spacers abutting said plates and separating the adjacent surfaces of said fitting and plate for eliminating chafing therebetween, and fastening means for securing said fitting to said blade and plate at said root.

2. In a helicopter rotor blade adapted to be subjected to high centrifugal loads and having a spanwise load carrying spar of uniform cross section, means for increasing the effective thickness of the root end of said spar including spanwise members adhesively attached to the upper and lower surfaces of said spar adjacent said root for carrying a portion of said loads being transmitted from the outboard end of said spar to the threshold of said root, said adhesive attachments permitting load absorption in said members at said threshold substantially free of stress concentrations, and means for further gradually increasing the effective thickness of the root end of said spar including a blade retention fitting having spanwise stepped elements in juxtaposition with an inboard portion of the exposed surfaces of said members, said elements being positively attached to said spanwise members and spar by locking members passing through said spanwise members and spar.

3. A rotor blade according to claim 2 wherein an anti-chafing strip is positioned between the adjacent surfaces of said spanwise members and spanwise stepped elements.

4. In a metal helicopter rotor blade having a uniform load carrying hollow metal spar; means for gradually increasing the effective thickness of the root end of said spar including spanwise metal plate members adhesively secured to opposite outer surfaces of the root end of said spar; phenolic spacers positioned on an inboard portion of the exposed surfaces of said members; a blade retention fitting attached to the root end of said spar including spanwise elements secured in juxtaposition with said spacers; an inner filler block between opposite inner surfaces of said spar positioned approximately midway of the spanwise dimension of said plate members for filling a portion of the hollow space in the root end of said spar; a plurality of fastening members passing through both of said elements, said spacers, said plate members, said block and said spar; and additional fasteners inboard of said first mentioned fasteners each connecting only one of said spar surfaces and its adjacent plate and spacer including spanwise washers adjacent the inner opposite surfaces of said spar which are fixed in position by said additional fasteners.

5. A metal blade for rotary wing aircraft comprising a spar, a retention fitting for connecting the root end of said spar to a rotor hub including spaced upper and lower stepped plates between which said spar is receivable, said plates having their steps arranged to provide diminishing thickness in an outboard direction, and means for absorbing a substantial portion of the load due to centrifugal forces resulting from the rotation of said blade in a portion of said blade root adjacent and outboard of said fitting which is free from stress concentrations, including reinforcing metal plates located between said stepped plates and said spar having imperforate portions thereof located outboard of the extremity of said stepped plates and overlying said spar, adhesive means for permanently bonding the imperforate portions of said reinforcing plates to said spar, and fastening means extended through the overlapping portions of said stepped plates, said reinforcing plates and said spar.

6. In a metal rotor blade for rotary wing aircraft, a spanwise load carrying spar of generally uniform cross section from root to tip, a blade retention fitting by which the blade is adapted to be connected to a rotor hub, said fitting having upper and lower plate-like members between which the root of said spar is receivable, fastening means extended through the overlapping portions of said spar and fitting, reinforcing plates between said members and said spar having perforate inboard portions through which said fastening means extend and imperforate portions outboard of said fitting which overlie the upper and lower surfaces of said spar, and adhesive means between the imperforate portions of said plates and the surfaces of said spar for providing load carrying areas free from stress concentrations.

7. In a metal rotor blade for rotary wing aircraft, a spanwise load carrying spar of generally uniform cross section from root to tip, a blade retention fitting by which the blade is adapted to be connected to a rotor hub, said fitting having upper and lower plate-like members between which the root of said spar is receivable, fastening means extended through the overlapping portions of said spar and fitting, reinforcing plates between said members and said spar having perforate inboard portions through which said fastening means extend and spanwise tapered imperforate portions outboard of said fitting which overlie the upper and lower surfaces of said spar, and adhesive means between the imperforate portions of said plates and the surfaces of said spar for providing load carrying areas free from stress concentrations.

8. A metal blade for rotary wing aircraft comprising a spar, a retention fitting for connecting the root of said spar to a rotor hub including spaced upper and lower plate-like members between which the root of said spar is receivable, said members having diminishing thickness in an outboard direction, and means for absorbing a substantial portion of the load due to centrifugal forces resulting from the rotation of said blade in a portion of said blade root adjacent and outboard of said fitting which is free from stress concentrations, including reinforcing metal plates between said plate-like members and said spar having imperforate portions thereof located outboard of the extremity of said members and overlying said spar, adhesive means for permanently bonding said imperforate portions of said reinforcing plates to said spar, and fastening means extended through the overlapping portions of said plate-like members, said reinforcing plates and said spar.

9. In a metal rotor blade for rotary wing aircraft, a spanwise load carrying spar, a blade retention fitting by which the blade is adapted to be connected to a rotor hub, said fitting having upper and lower plate-like members between which the root of said spar is receivable, fastening means extended through the overlapping portions of said spar and fitting, reinforcing plates between said members and said spar having perforate inboard portions through which said fastening means extend and imperforate portions outboard of said fitting which overlie the upper and lower surfaces of said spar, and adhesive means between the imperforate portions of said plates and the surfaces of said spar for providing load carrying areas free from stress concentrations.

MICHAEL E. GLUHAREFF.

REFERENCES CITED

The following references are of record in the file of this patent:

UNITED STATES PATENTS

| Number | Name | Date |
| --- | --- | --- |
| 2,056,592 | Siddeley | Oct. 6, 1936 |
| 2,152,861 | Bennett | Apr. 4, 1939 |
| 2,303,707 | Pullin | Dec. 1, 1942 |
| 2,426,123 | Sikorsky | Aug. 19, 1947 |

FOREIGN PATENTS

| Number | Country | Date |
| --- | --- | --- |
| 591,117 | France | Apr. 2, 1925 |